United States Patent [19]

Linlor

[11] 4,240,873
[45] Dec. 23, 1980

[54] SOLENOIDAL FUSION SYSTEM

[76] Inventor: William I. Linlor, 1010 Madison Dr., Mountain View, Calif. 94040

[21] Appl. No.: 945,011

[22] Filed: Sep. 22, 1978

[51] Int. Cl.³ .............................................. G21B 1/02
[52] U.S. Cl. ............................................. 176/3; 176/5
[58] Field of Search ....................... 176/2, 3, 4, 5, 7, 9

[56] References Cited

U.S. PATENT DOCUMENTS

| | | | |
|---|---|---|---|
| 3,012,955 | 12/1961 | Kulsrud et al. | 176/3 |
| 3,085,173 | 4/1963 | Gibson et al. | 176/5 |
| 3,143,477 | 8/1964 | Dolique | 176/3 |
| 3,218,235 | 11/1965 | Ehler | 176/4 |
| 4,057,462 | 11/1977 | Jassby et al. | 176/5 |

OTHER PUBLICATIONS

Nuclear Fusion (17) 2 (1977) Jassby, pp. 309, 365.
Physics Today (5/79) Murakami et al., pp. 25–32.
Nuclear Fusion, vol. 15 (1975 Oct.) pp. 947–951, Chu et al.
IEEE Trans, Nuc. Sci., vol. NS-22 (6/75) pp. 1790–1793, Maglich et al.

*Primary Examiner*—S. A. Cancialosi

[57] ABSTRACT

This invention discloses apparatus and methods to produce nuclear fusion utilizing fusible material in the form of high energy ion beams confined in magnetic fields. For example, beams of deuterons and tritons are injected in the same direction relative to the axis of a vacuum chamber. The ion beams are confined by the magnetic fields of long solenoids. The products of the fusion reactions, such as neutrons and alpha particles, escape to the wall surrounding the vacuum chamber, producing heat. The momentum of the deuterons is approximately equal to the momentum of the tritons, so that both types of ions follow the same path in the confining magnetic field. The velocity of the deuteron is sufficiently greater than the velocity of the triton so that overtaking collisions occur at a relative velocity which produces a high fusion reaction cross section. Electrons for space charge neutralization are obtained by ionization of residual gas in the vacuum chamber, and additionally from solid material (irradiated with ultra-violet light or other energetic radiation) adjacent to the confinement region. For start-up operation, injected high-energy molecular ions can be dissociated by intense laser beam, producing trapping via change of charge state. When sufficiently intense deuteron and triton beams have been produced, the laser beam can be removed, and subsequent change of charge state can be achieved by collisions (circulating and injected beams).

9 Claims, 6 Drawing Figures

SOLENOIDAL FUSION SYSTEM

RELATED APPLICATION

A patent application was submitted by the present inventor on Aug. 28, 1978, having the title: THERMONUCLEAR FUSION SYSTEM, which is also based on the concept of overtaking collisions, but which is based on guiding (i.e., confining) magnetic fields that are not similar to the ones being disclosed here.

BACKGROUND OF THE INVENTION

Prior art dealing with fusion research is extensive; representative summaries are given in Appendix A, which may be consulted for explanation of scientific terms that are employed in this patent description. Although many patents have been issued for "fusion systems", to date none of these systems has reached the milestone of releasing fusion energy equal to the amount originally invested in the plasma. Indeed, all systems that have been tested experimentally have fallen far short of this "break-even" goal.

Two general approaches have been developed during the past decades of fusion research: One is "inertial confinement" in which the nuclei react during a time that is less than the disassembly time (because of the inertia of the particles). The second is "magnetic confinement" employing configurations of magnetic fields termed mirror-machine, stellarator, tokomak, etc. These are described in the reference of Appendix A. In each case, the nuclei are "thermalized" in the sense that fusion reactions occur via essentially "head-on" impacts; stated alternatively, the nuclei have distributions in velocity and in angle, somewhat resembling the case of molecules of gas in a container.

For the plasmas of all present-day fusion devices, the center of mass is stationary in the laboratory frame of reference, just as it is true for the molecules of a gas in a container. This point is important, because for the invention to be described below, the center of mass of the energetic nuclei has a high velocity in the laboratory frame of reference. This fact, together with the solenoidal magnetic field confining apparatus, represents a novel combination, having characteristics and advantages that are described in the following pages.

The title of this patent disclosure involves the concept of a solenoidal magnetic field. By itself, such a concept is not at all novel. Indeed, the well-known "Helmholtz coils" that are used in magnetics developments provide a solenoidal-type magnetic field that has an essentially uniform intensity in its central plane. Also, the well-known magnetic field configuration of a cyclotron has some resemblance to a solenoidal magnetic field. The "mirror-machine" and the "Astron" devices of contemporary plasma research are also variations of the "Helmholtz coils", in regard to the magnetic field configuration. However, the combination of specific plasmas in the magnetic fields represents the novelty of the approaches. The "Astron" approach, for example, seeks to obtain an "E" layer (originally consisting of electron beams, and later of ion beams) of sufficient intensity to "reverse" the direction of the local magnetic field, thereby providing a confinement field for a thermalized plasma.

In the description to be given below, the combination of a novel plasma and a solenoidal-type magnetic field provides certain important features and advantages, as will be pointed out.

It is important to note that the operating regime of this thermonuclear fusion system differs markedly from its "start-up" regime. The initial production of the moving-plasma (consisting of the ion beams plus space-charge neutralizing electrons) can be accomplished with the aid of laser beams; these are not needed after the operating conditions are achieved.

SUMMARY OF THE INVENTION

This invention relates to a novel method for producing nuclear fusion, using a "moving plasma" confined in a magnetic field. The invention contemplates the use of fusible ions in such a way that the paths of the ions are essentially coincident, thus producing approximately continuous reaction paths.

The speeds of the ions are selected so that the momentum is proportional to the number of positive charges of the ion; for example, the momentum of a deuteron is selected to be approximately equal to the momentum of a triton, since each carries the same electric charge. The ion beams have the same direction relative to the machine axis, but the deuteron velocity is greater than the triton velocity, so that overtaking collisions occur. This relative velocity is selected so as to produce a high fusion reaction cross section.

The fusible ion beams (deuterons and tritons, for example), together with electrons for space-charge neutralization, constitute a "moving-plasma" in the laboratory frame of reference. Because of the center-of-mass motion, scattering angles become reduced when referred to the laboratory frame of reference. For example, deuterons and tritons are limited to scattering angles of less than 15 degrees in the laboratory frame of reference, even though they have been scattered through an angle of 90 degrees in the center-of-mass frame of reference.

The basic configuration for this invention consists of two (or alternatively, one) long straight units, each of length L centimeters, which is typically several kilometers long. The plasma consists of ion beams and space-charge neutralizing electrons; the ion beams move essentially on the surface of an imaginary cylinder, whose axis is coincident with the axis of the vacuum chamber. The vacuum chamber is coaxial with the axis of the long solenoid of length L.

The magnetic field within the solenoid is essentially parallel to the axis of the solenoid for most of the length L, but increases in intensity near the end of the solenoid (as in a cyclotron or in Holmholtz-coils arrangement). This increase in magnetic field causes the ion beams to be repelled from the ends, and thus the plasma is contained within the length L.

The magnetic flux is constrained to follow designated paths by the provision of semi-circular paths at the ends of the solenoids.

Detailed descriptions of the various solenoidal magnetic fields are given in the later portions of this disclosure.

The ion beams are injected into the magnetic field in the form of molecular ions having high energy. While within the magnetic field they are dissociated by the action of laser-beam photons, and thus are trapped. After a sufficiently high density of ions has been trapped, the laser beams can be turned off, and subsequent change-of-charge state can proceed via collisions of the injected molecular ions with the trapped beam ions.

Electrons for space-charge neutralization are obtained from ionization of the residual gas, or from other sources at the end regions of the solenoid, such as aluminum plates that are illuminated by ultra-violet light.

In the steady-state regime, the beams of deuterons and tritons continue to circulate until fusion reactions remove them from the system. The Coulomb scattering is limited to less than about 15 degrees, as will be explained below, so the paths of the beams are limited to the region between two coaxial cylindrical surfaces.

The magnetic field configurations to be described below may appear to have a superficial resemblance to that of a "mirror-machine" or "Astron", but there exist basic and fundamental differences. The references in Appendix A describe existing approaches in detail, and so these will not be repeated here. However, in the "mirror-machine" the plasma ions must have "head-on impacts" in order to produce fusion events. In the "Astron" device, circulating beams are intended to produce magnetic field reversal, and plasma is intended to be trapped within such a modified magnetic field; the plasma ions must have "head-on impact" in order to produce a fusion event. Thus neither of these types of machines is based on the overtaking collisions of the present disclosure. The beams of deuterons and tritons in the present invention must have quite specific relationships in regard to relative velocity and in regard to momentum, otherwise the paths of the beams would not overlap to give essentially continuous reaction paths, and also small values for the Coulomb scattering.

BRIEF DESCRIPTION OF THE DRAWINGS

In the drawings, like elements are referenced alike.

DETAILED DESCRIPTION

EXAMPLE I: EMBODIMENT WITH LONG, STRAIGHT SOLENOIDS

The first illustrative embodiment of the present invention will now be given, shown in the schematic drawing of FIG. 1. This is intended to show two long, straight solenoids having soft-iron members (essentially semi-circular) to provide paths for the magnetic flux. Of course it is possible and feasible to employ only one of the two long, straight solenoids, in which case the return flux would exist in the region outside the solenoid. In the case of a single solenoid, soft-iron pole pieces would be needed to produce a local increase in magnetic flux intensity, for reasons to be described below.

Figure 1:
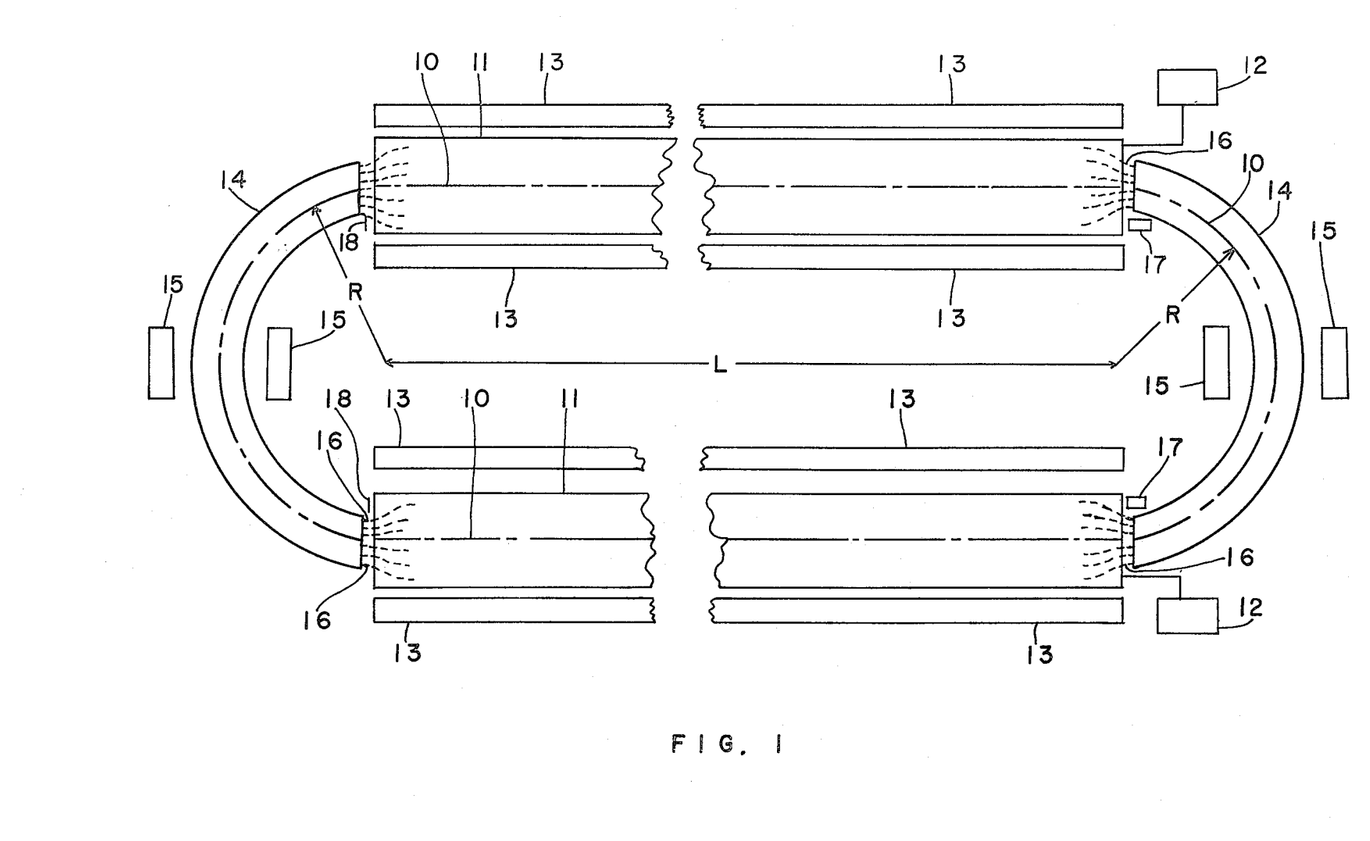
FIG. 1 is a sketch of the component parts of a system using two long solenoids, and soft-iron connecting members. The concentration of flux lines at the ends are indicated by dashed lines.

In FIG. 1, a vacuum chamber, 11, has an axis, 10, that is coaxial with the long, straight solenoid, 13. A vacuum pump, 12, maintains a vacuum environment within the chamber, 11, so that air and other gases will not interfere with the plasma. The vacuum chamber, 11, and solenoid, 13, have a length L typically several kilometers long.

Figure 2:
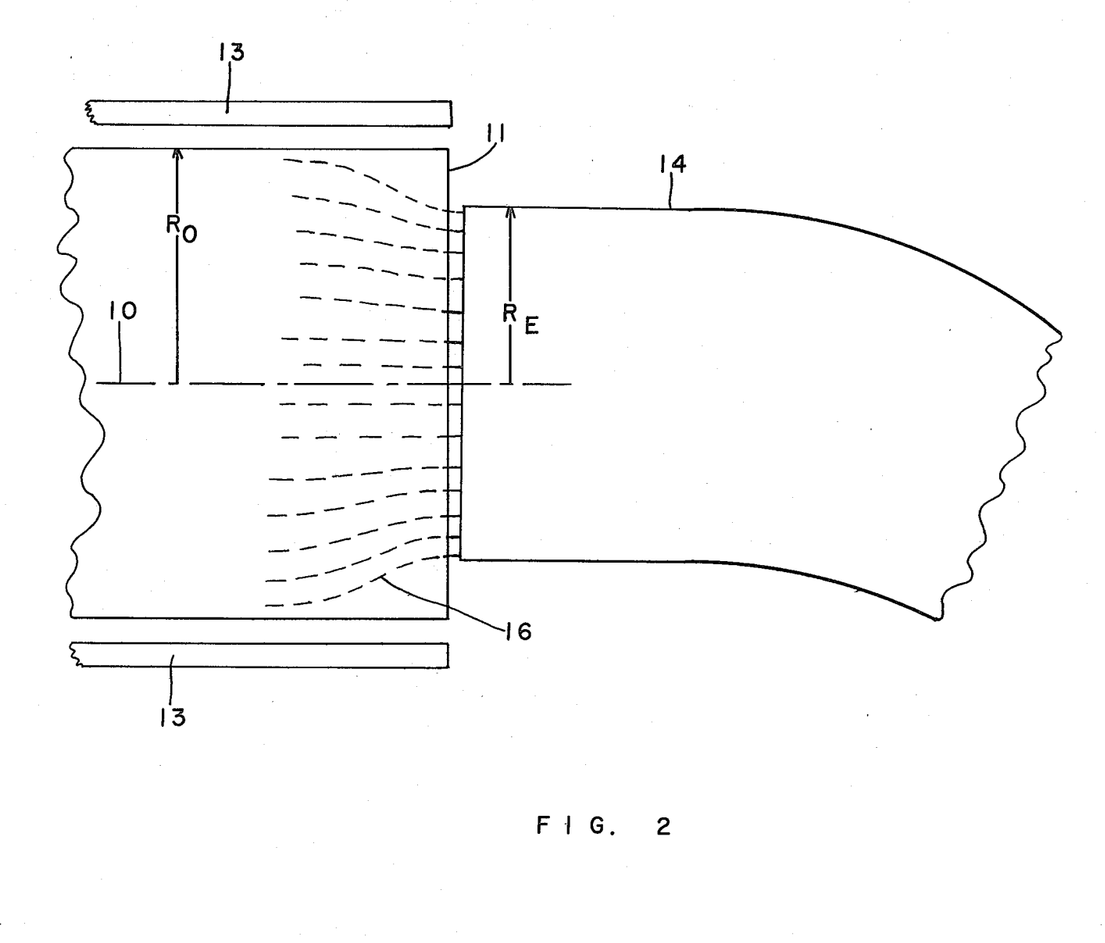
FIG. 2 shows the magnetic flux lines and pole piece.

The magnetic field within the solenoid is of essentially uniform intensity, with a direction that is parallel to the axis, 10. Near the ends of the solenoid, soft-iron pole pieces, 14, cause the magnetic flux to be locally increased in intensity. This effect is shown in detail in FIG. 2, in which the magnetic flux lines are depicted by dotted lines, 16. In FIG. 2, as in FIG. 1, the axis is shown by the number 10, the solenoid coil by 13, the vacuum chamber by 11, and the soft-iron pole piece by 14. The purpose and effect of the local increase in magnetic field intensity at the ends of the solenoid, 13, will be described below.

In FIG. 1 each soft-iron pole piece, 14, has a coil, 15, to provide magnetomotive force so that the magnetic flux lines can traverse the pole piece readily. Also shown in FIG. 1 is a laser, 17, and a reflector, 18, whose purpose is described below.

Figure 3:
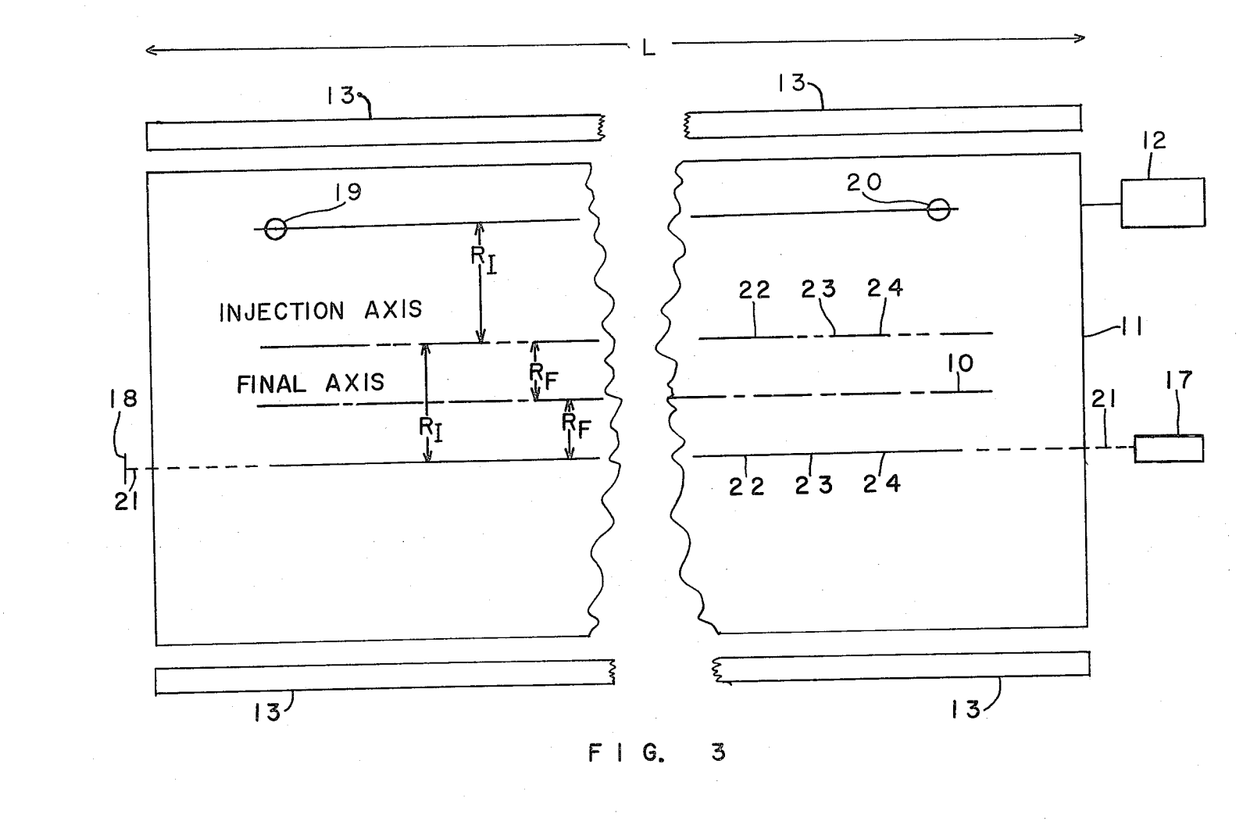
FIG. 3 shows the $D_2^+$ and $T_2^+$ injectors, and the laser beam for dissociating the molecular ions, to produce a change in charge state. The injection axis and final axis are indicated.

Additional details are provided in FIG. 3, which shows the axis, 10; vacuum chamber, 11; vacuum pump, 12; solenoid coil, 13; laser, 17; laser beam, 21; and laser beam reflector, 18. An injector for $D_2^+$ ions is shown, 19, and also an injector for $T_2^+$ ions is shown, 20.

Figure 4:
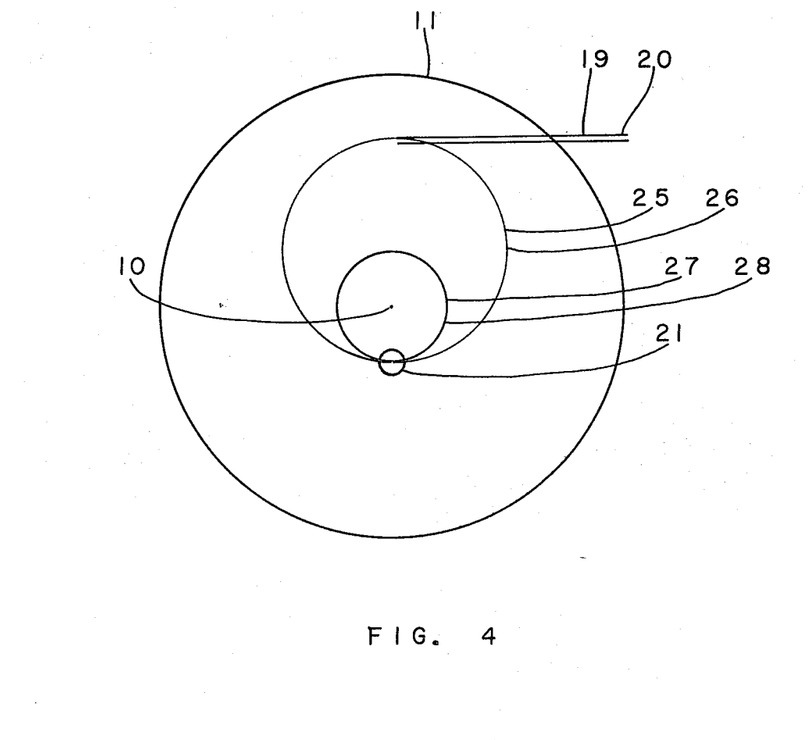
FIG. 4 shows an end view of the injection method. The deuteron and triton circular paths are shown.

For the explanation of the beam injection process, FIG. 4 is helpful. It represents an end view of FIG. 3, namely the molecular ion injectors 19 and 20, and the laser beam, 21. The injectors produce beams of $D_2^+$ and $T_2^+$ ions whose trajectory in the magnetic field of the solenoid, 13, is essentially a circle of radius $R_I$, shown in FIG. 3; the corresponding axis is labelled "INJECTION AXIS" in FIG. 3. The molecular ions are irradiated by the laser beam, 21, in a localized region as shown in FIG. 4, and are thereby dissociated (i. e., split apart into an ion and a neutral atom). Because of the change in the ion mass, the new radius of the $D^+$ (or $T^+$) ion is shown by $R_F$ in FIG. 3. Thus the $D^+$ and $T^+$ ion beams are trapped in the magnetic field, and the circulating beams are identified in FIG. 3 by 22, 23, and 24, respectively denoting the deuteron beam current, the triton beam current, and the net beam current.

When a sufficiently-intense beam of circulating ions has been achieved, the laser beam is not necessary for subsequent trapping of the ions, because the injected molecular ions can collide with the trapped ions in the region of the laser beam, 21. Such collisions produce dissociation of the injected molecular ion beam.

In order that the deuteron beam, 22, and triton beam, 23, shown in FIG. 3 have the same radius of curvature in the magnetic field (and therefore have essentially identical, overlapping paths) the momentum of the deuterons must be equal to the momentum of the tritons. Mathematically, in the magnetic field of B gauss produced by the solenoid, 13, the turning radius of the deuterons and tritons is given by:

$$BeR_D = M_D V_D \qquad (1)$$

$$BeR_T = M_T V_T \qquad (2)$$

where $R_D$ and $R_T$ are respectively the radius of curvature of the paths of the deuterons and tritons in the magnetic field B; $M_D$ and $M_T$ represent the masses of the deuterons and tritons respectively; e represents the electric charge carried by these ions, each being equal to one electronic charge in magnitude but positive in sign; $V_D$ and $V_T$ represent the velocity of the deuterons and tritons respectively.

For the momentum $M_D V_D$ equal to the momentum $M_T V_T$, the turning-radius $R_D$ is equal to the turning-radius $R_T$. This specifies the condition that the paths of the ions be essentially coincident.

The well known fusion reaction of deuterium and tritium is $$D + T \rightarrow He^4 (3.5 \text{ Mev}) + n (14.1 \text{ Mev}) \tag{3}$$

where $He^4$ represents helium having atomic mass of 4 and n represents a neutron.

From published fusion literature, such as FIG. 2.3 of Glasstone and Lovberg's book (see Appendix A), it is known that the maximum deuteron-triton (i. e., "DT") fusion cross section occurs when a deuteron having about 120,000 electron-volts of energy is incident on a target triton. This can be alternatively stated in terms of the relative velocity of the deuteron and triton: the maximum DT fusion cross section occurs when the D velocity relative to the T ion lies between $3 \times 10^8$ cm/sec and $4 \times 10^8$ cm/sec. To be specific, let us select for illustration the value of $4 \times 10^8$ cm/sec as the velocity of the deuteron relative to the target triton; the corresponding fusion cross section is about $4 \times 10^{-24}$ cm$^2$.

Thus, the relation for the velocities of the ions can be written as follows:

$$V_D = V_T + 4 \times 10^8 \text{ cm/sec} \tag{4}$$

From equations (1) and (2) we obtain:

$$M_D V_D = M_T V_T \tag{5}$$

Using equation (4) and (5) we can obtain values for $V_D$ and $V_T$, since the masses $M_D$ and $M_T$ are known.

Note that in this invention a target triton is not at rest in the laboratory frame of reference, but has a velocity $V_T$. We should note also that the equations (4) and (5) need not be satisfied exactly, but rather that they represent a desirable criterion; namely, the velocities for which the paths overlap and for which the fusion reaction cross section is near its peak value. Fusion reactions can occur, although at a different cross-section value, if the deuteron velocity is greater or less than the illustrative values given by equations (4) and (5).

The values obtained for the velocities $V_D$ and $V_T$ from equations (4) and (5), using $M_T = (3/2) M_D$ are:

$$V_D = 12 \times 10^8 \text{ cm/sec} \tag{6}$$

$$V_T = 8 \times 10^8 \text{ cm/sec} \tag{7}$$

Let us next consider the scattering caused by Coulomb collisions between the deuterons and the tritons. To do so we need to distinguish between "center of mass" (i. e., CM) frame of reference, and the "laboratory" frame of reference. We shall see that even though the Coulomb scattering is 90 degrees in the CM frame of reference, the effect of the CM motion limits the scattering angle to a small value in the laboratory frame. Thus the particles of the beam maintain a high degree of ordered motion, and retain the "beam" character, even after repeated Coulomb collisions.

With the "atomic scale" of units, in which the masses $M_D$ and $M_T$ are 2 and 3 respectively, the momentum of the center of mass is given by the well-known relation:

$$M_C V_C = M_D V_D + M_T V_T \tag{8}$$

where $V_C$ represents the velocity of the center of mass, and $M_C$ represents the mass of the center-of-mass unit, given by:

$$M_C = M_D + M_T = 2 + 3 = 5 \tag{9}$$

Using the preceding equations, we find that the velocity of the center-of-mass unit is given by:

$$V_C = (M_D V_D + M_T V_T)/(M_D + M_T) = 9.60 \times 10^8 \text{ cm/sec} \tag{10}$$

In the CM frame of reference, the relative velocities of the deuterons and tritons are given by:

$$\begin{aligned} _C V_D &= V_D - V_C \\ &= 12 \times 10^8 - 9.60 \times 10^8 \text{ cm/sec} \\ &= 2.40 \times 10^8 \text{ cm/sec} \end{aligned} \tag{11}$$

$$\begin{aligned} _C V_T &= V_T - V_C \\ &= 8 \times 10^8 \text{ cm/sec} - 9.6 \times 10^8 \text{ cm/sec} \\ &= -1.6 \times 10^8 \text{ cm/sec} \end{aligned} \tag{12}$$

The significance of the two preceding equation, (11) and (12), is that the deuterons are overtaking the center of mass with the (relative) velocity of $2.4 \times 10^8$ cm/sec, and the tritons are being overtaken by the center of mass by the relative velocity of $1.6 \times 10^8$ cm/sec. The deuterons and tritons have a relative velocity of $2.4 \times 10^8$ cm/sec plus $1.6 \times 10^8$ cm/sec, totaling $4.0 \times 10^8$ cm/sec, which is equally true in the laboratory frame of reference or the center-of-mass frame of reference.

For the CM frame of reference:
$V_C = 9.60 \times 10^8$ cm/sec
$_C V_D = 2.40 \times 10^8$ cm/sec
$_C V_T = 1.60 \times 10^8$ cm/sec
$_C W_D = 60.00 \times 10^3$ electron-volts
$_C W_T = 40.00 \times 10^3$ electron-volts where $_C W_D$ and $_C W_T$ represent the deuteron and triton kinetic energy with reference to the CM frame of reference.

The Coulomb collisions between deuterons and tritons produce a distribution of velocities. In the CM frame of reference, the effect of repeated Coulomb collisions may cause a rotation of the relative velocity vector, $_C V_D$ or $_C V_T$ through the maximum amount possible, namely 90 degrees.

In the laboratory frame of reference, such highly-scattered ions are deviated by angles that are given by dividing the lateral velocity by the center-of-mass velocity. For a neutron:

$$\begin{aligned} \theta_D &= \arctan {_C V_D}/V_C = \arctan 2.4 \times 10^8 / 9.6 \times 10^8 \\ &= \arctan 0.25 = 14 \text{ degrees} \end{aligned} \tag{13}$$

For a triton:

$$\begin{aligned} \theta_T &= \arctan {_C V_T}/V_C = \arctan 1.6 \times 10^8 / 9.6 \times 10^8 \\ &= \arctan 0.17 = 9.5 \text{ degrees} \end{aligned}$$

From the preceding discussion it is evident that the ions can essentially "thermalize" in the CM frame of reference, but at the same time retain the beam character in the laboratory frame of reference.

Stated alternatively, for the present disclosure the ions have "head-on" impacts in the center-of-mass system, but because the center of mass has a high velocity in the laboratory frame of reference, the ions all continue to travel in essentially a beam in the laboratory frame of reference.

Space-charge neutralization is important for intense ion beams, for example haveing a density of $10^{13}$ ions per cm$^3$ and higher. The electrons necessary for space-charge neutralization can be obtained from a variety of sources, such as ionization of residual background gas in the vacuum chamber, 11, or from the metal surfaces at the ends of the vacuum chamber where they are close to the soft-iron pole pieces, 14. The metal surfaces can be aluminum, irradiated by ultra-violet light, to emit electrons.

The space charge of the ions need not be exactly compensated by the space charge of the electrons; a slight excess of positive charge permits the containment of electrons by the attraction of the positively-charged ion beams. Because the ion beams are contained by the magnetic field of the solenoid, the electrons are constrained to remain in the vicinity of the ions by the net positive charge.

Let us now consider the containment of the ion beams at the ends of the long solenoids. For most of the length of the solenoid the magnetic field intensity is a constant value, taken to be $B_o$. At the ends of the solenoids, the magnetic field intensity is taken to be a slightly larger value, namely $B_e$.

Previously we calculated that the ions that have been scattered 90 degrees in the CM frame of reference have a deflection angle of less than 15 degrees in the laboratory frame of reference. For convenience in calculation let us arbitrarily assume that the deflection angle is 18.4 degrees in the laboratory frame of reference, which corresponds to a ratio of 1:3 of lateral velocity compared to CM velocity. (For tan $x = \frac{1}{3}$, $x = 18.4$ degrees.) This means that the kinetic energy associated with lateral motion is $(\frac{1}{3})^2$ as great as the kinetic energy associated with forward motion. Since the magnetic moment of an ion is constant in the magnetic field, and since the kinetic energy of the ion can be expressed as the product of the magnetic moment multiplied by the magnetic field intensity, it follows that if $B_e$ is greater than $B_o$ by the ratio $\{1+(\frac{1}{3})^2\}$, the ion does not have sufficient kinetic energy to proceed to a more intense magnetic field region; in other words, the ion is reflected from the more intense magnetic field region.

Referring to FIG. 2, we see that $R_o^2 B_o = R_e^2 B_e$. In the preceding paragraph we found that $B_e/B_o = 1.1111$ (or greater). Hence we obtain $R_o/R_e = (1.1111)^{\frac{1}{2}}$ or greater; this leads to $R_o/R_e = 1.0541$ or greater. Thus the diameter of the soft-iron pole pieces is only slightly smaller than the diameter of the vacuum chamber, 11, which is taken to be essentially the diameter of the solenoid coil, 13.

The preceding explanation of the containment of the circulating ions is based on constancy of the magnetic moment. An alternative explanation can be based on the well-known cyclotron focusing action; this depends on the curvature of the magnetic field lines, which produces a component of the magnetic field that interacts with the velocity of the ion to cause the ion to be forced away from the cyclotron pole piece. One could regard each leg of FIG. 1 to be a "cyclotron pole configuration" but with a very long air gap, the flux of which is maintained by the long solenoid.

System characteristics for the illustrative version of EXAMPLE I are now calculated, and summarized in TABLE I. Only one leg of the system shown in FIG. 1 is used in the calculation; for both legs, the performance must of course be multiplied by the factor 2.

The length of the straight portion, L, is taken to be $10^5$ cm. The magnetic field intensity of the long solenoid is taken to be $10^5$ gauss. The kinetic energy of the tritons is 1.0 Mev, and for the deuterons it is 1.5 Mev. The density of the deuterons in the (circulating) beam is taken to be $10^{14}$ per cm$^3$ in the steady-state, and this is also the density of the tritons per cm$^3$ in the beam.

The deuteron velocity is $12 \times 10^8$ cm/sec; the triton velocity is $8 \times 10^8$ cm/sec, so the relative velocity of the deuterons with regard to the tritons is $4 \times 10^8$ cm/sec. At this relative velocity the fusion cross section is approximately $5 \times 10^{-24}$ cm$^2$. The energy release per fusion reaction produced by DT fusion is 17.6 Mev, plus wall reactions of the emitted neutron with lithium of 4.8 Mev. The fusion power produced per cm$^3$ of the beam is readily calculated to be 71.77 watts/cm$^3$ (thermal power).

In the magnetic field, $B_o$, having intensity of $10^5$ gauss, the orbit radius of the deuterons and tritons is equal to 2.506 cm, for both types of ions, because their momenta are equal. We take the radial extent of the ion beams to be one centimeter. Thus the fusion power per centimeter length of the machine is $1.13 \times 10^3$ watts per cm. For the total length, L, of the machine, the fusion power is $1.13 \times 10^8$ watts, thermal.

The power for the solenoid coils, 13, of FIG. 1, is quite large if copper is used at room temperature. Consequently, the solenoid coils should be constructed of superconducting material.

A conventional conversion apparatus, operating at overall efficiency of 40% is taken to be available, because such an apparatus is well known in thermodynamic art. The net electric power produced is estimated to be about $10^7$ watts in each leg of the system of FIG. 1.

TABLE I

| | | |
|---|---|---|
| L | = 1.00 × 10$^5$ cm | Machine length |
| $B_o$ | = 1.00 × 10$^5$ gauss | Magnetic field intensity |
| $R_F$ | = 2.51 cm | Orbit radius of deuteron and triton |
| $V_D$ | = 1.20 × 10$^9$ cm/sec | Deuteron velocity |
| $V_T$ | = 8.00 × 10$^8$ cm/sec | Triton velocity |
| $n_D$ | = 1.00 × 10$^{14}$ cm$^{-3}$ | Deuteron beam density |
| $n_T$ | = 1.00 × 10$^{14}$ cm$^{-3}$ | Triton beam density |
| $P_F$/cm$^3$ | = 7.18 × 10$^1$ w/cm$^3$ | Fusion thermal power, watts/cm$^3$ |
| $P_F$ | = 1.13 × 10$^8$ watts | Fusion power, watts-thermal |
| $I_B$ | = 3.20 × 10$^4$ amp/cm | Beam current per cm of machine |
| $\theta_D$ | = 1.40 × 10$^1$ deg. | Maximum scattering angle (deuterons) |
| $P_L$ | = 2.00 × 10$^4$ w/cm$^2$ | Laser power/cm$^2$ for start-up |

The intense deuteron and triton beams have considerable momentum, very much larger than the momentum of the electrons that are necessary for space-charge neutralization. Consequently, no significant forces are available to deflect the ion beams from the desired paths.

EXAMPLE II: EMBODIMENT WITH SOLENOIDS HAVING END COILS

Figure 5:
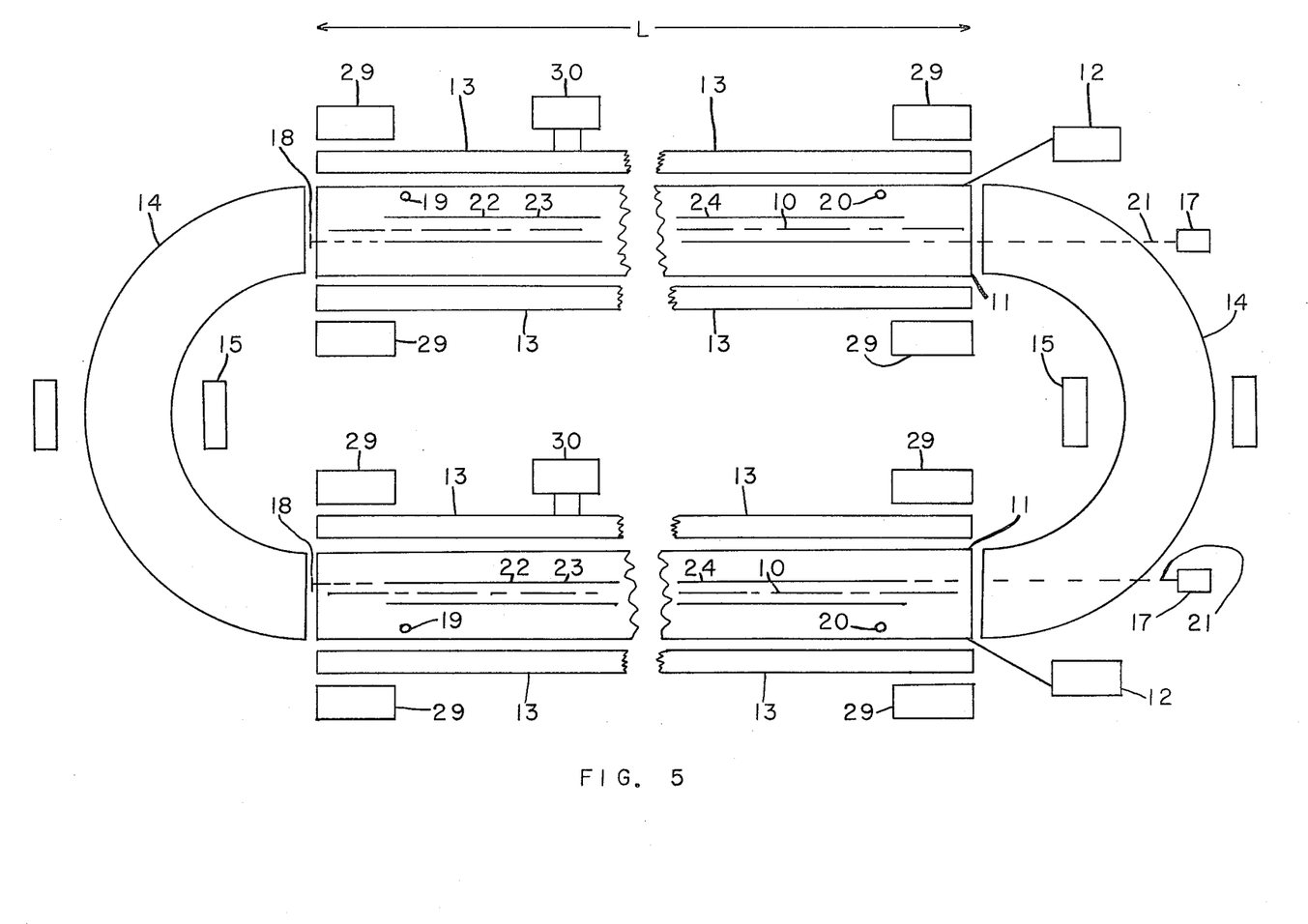
FIG. 5 shows the component parts of a system using two long solenoids and coils at the ends, with soft-iron connectors.

A second illustrative version of the present invention will now be given, shown in the schematic drawing of FIG. 5, with additional details in FIG. 6. In FIG. 5, are shown two long, straight solenoids having soft-iron members (essentially semi-circular) to provide paths for the magnetic flux. Of course it is possible and feasible to employ only one of the two long, straight solenoids, in which case the return flux would exist in the region outside the solenoid. In such a case, the soft-iron pole pieces would not be needed.

In FIG. 5, a vacuum chamber, 11, has an axis, 10, that is coaxial with the long, straight solenoid, 13. A vacuum pump, 12, maintains a vacuum environment within the chamber, 11, so that air and other gases will not interfere with the plasma. The vacuum chamber, 11, and solenoid, 13, have a length L typically several kilometers long.

The magnetic field within the solenoid is of essentially uniform intensity, with a direction that is parallel to the axis, 10. Near the ends of the solenoid, additional coils 29, cause the magnetic flux to be locally increased in intensity, as shown by the plot of B versus "MACHINE AXIS" at the bottom of FIG. 6. The effect of the local increase in flux intensity is to "repel" the ions from this region, as explained in connection with EXAMPLE I.

Figure 6:
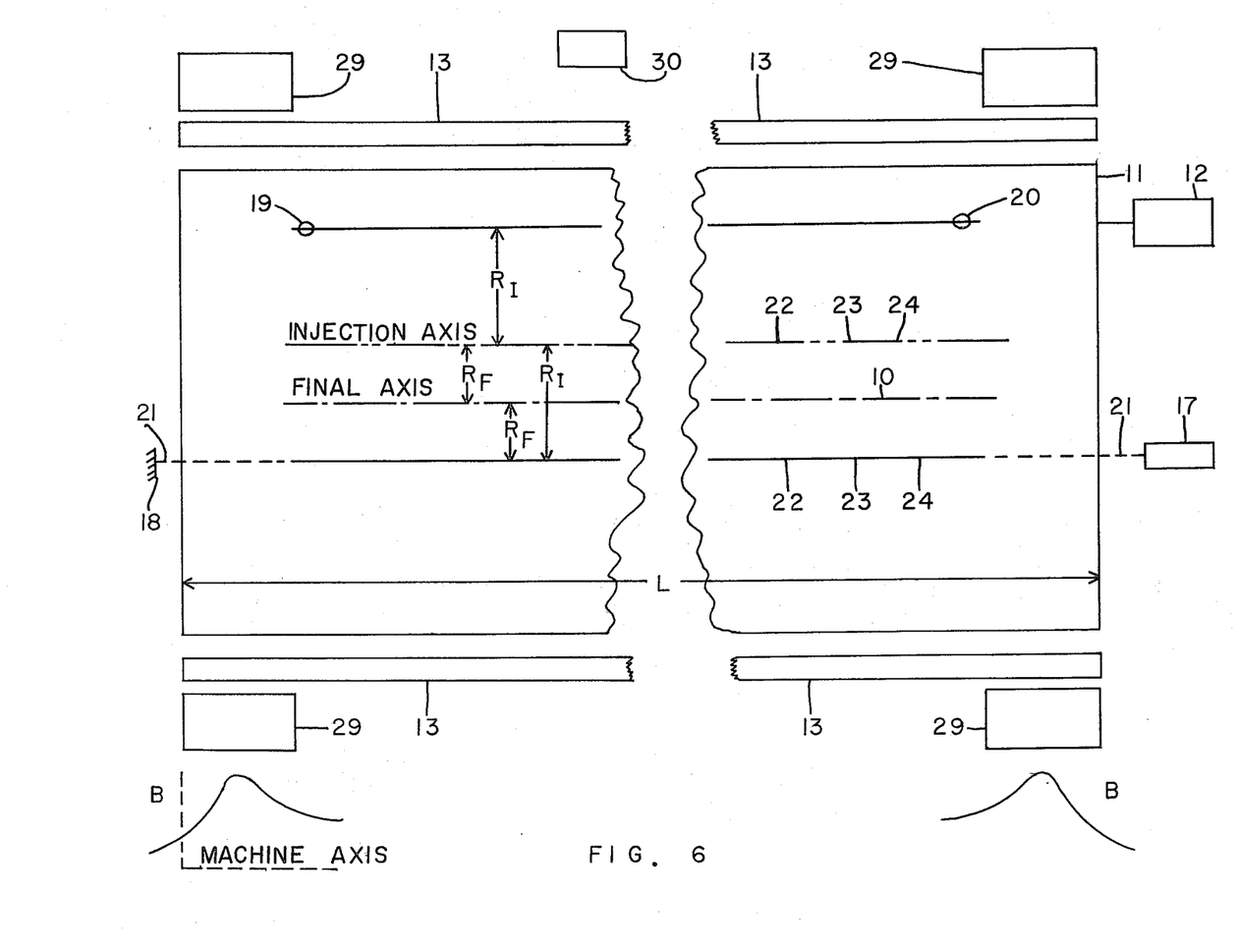
FIG. 6 shows the details for one leg of the FIG. 5.

A laser, 17, produces a laser beam, 21, to produce photodissociation of injected molecular ions, $D_2^+$ and $T_2^+$, so as to trap circulating beams of deuterons and tritons, as indicated in FIG. 6. Injectors, 19 and 20, are positioned so that the $D_2^+$ and $T_2^+$ ions, having the same momentum, have the radius $R_I$ with respect to the INJECTION AXIS. After dissociation by the laser beam, causing a change in charge state, the new radius of the circular orbit is $R_F$.

After sufficient density has been achieved in the trapped deuteron and triton beams, the laser beams can be turned off, and the change in charge state accomplished by collisions of the injected molecular ions with the trapped deuterons and tritons.

The preceding description for this EXAMPLE II has been concerned with only one leg of the system. The second leg is identical with the first one; the two legs are positioned so that the magnetic flux from one can pass to the other via the soft-iron pole pieces, 14, which have coils, 15, to aid in the passage of the magnetic flux lines through the pole pieces, as shown in FIG. 5.

Although EXAMPLES I and II have different magnetic field configurations, the injected beams are similar, and the performance characteristics are the same, as shown in TABLE I.

NOVEL FEATURES OF THE PRESENT INVENTION

The preceding material has given two examples of the present invention. It is appropriate to examine the differences between the present invention compared to the "Mirror-Machine" and "Astron" and also the disclosure of the writer dated Aug. 28, 1978, having the title: THERMONUCLEAR FUSION SYSTEM.

The clearest and most convincing evidence of the novelty of an invention is a practical matter—if a new device works, and predecessors do not, this is unquestionable proof of the novelty. It is well known that "Mirror-Machines" and "Astron" (and similar configurations) have been investigated since about 1958; after about twenty years of intensive development, none has been able to come close to "break-even", meaning that the energy produced by fusion reactions is far less than the energy initially invested in the plasma.

The argument might be made that the concept of injection of high-energy ion beams into mirror-machines is an old one; indeed, the writer has personally made such proposals (Wm. I. Linlor, "High Energy Peripheral Injection into Mirror Machines," University of California Radiation Laboratory Report UCRL-4569, Sept. 1955).

The very fact that a particular concept is old, and has been tried (such as the Oak Ridge DCX Mirror Machine with high-energy ion injection), and has not been made to work, is proof that it is not a valid bar to the novelty of another approach that does work.

The concept of over-taking collisions and equal momenta for the deuterons and tritons is a completely different approach than any existing or discarded Mirror Machine or Astron or similar configuration. As has been pointed out previously in this disclosure, all devices to date have employed the concept of "head-on" collisions, and thermalization of the ions in the laboratory frame of reference. In contrast, the present invention specifies the energy and momentum of the deuterons and tritons so that "over-taking" collisions and over-lapping paths are achieved, as well as small scattering angles in the laboratory frame of reference.

The present disclosure is not the same as the previous one of the writer dated Aug. 28, 1978, THERMONUCLEAR FUSION SYSTEM, submitted to the Patent Office. Briefly, the arrangements disclosed in the THERMONUCLEAR FUSION SYSTEM all are based on "race-track" paths. In versions that propose the use of solenoids the direction of the deuterons and tritons was in the axial direction. However, in the present disclosure, the direction of the ions is perpendicular to the solenoid axis. To those skilled in the art, this change in ion direction will be appreciated to be an important one, because it greatly affects the space-charge neutralization of the ion beams, as will now be discussed.

If an ion beam is directed across lines of magnetic flux, electrons cannot follow (because of the different sign of electric charge and because of the different momentum in general). But if electrons do not reach the ion beam path, the space charge of the ions can quickly reach such high values that many other effects appear, most of which are undesirable in regard to a fusion device. In the present EXAMPLE I and II, the ends of the magnetic flux lines intersect metal surfaces; if such metal surfaces are caused to emit electrons (by the action of ultra-violet light, for example) these can move along the lines of magnetic flux to the regions occupied by positive charge, and neutralize such positive charge.

Thus the space-charge neutralization process is quite different in regard to a solenoid, depending on whether the electrons must go along, or across, the magnetic lines of force.

These very basic considerations demonstrate that the present disclosure is novel, and different from the previous disclosure, THERMONUCLEAR FUSION SYSTEM; and also that the present disclosure is radically different from any of the devices proposed to date or under development in the fusion research efforts.

In fusion research to date, the instability of the plasma has been (and continues to be) a major problem. The use of intense deuteron and triton beams, having respectively 1.5 Mev and 1.0 Mev implies that the beams are "rigid" and cannot be readily moved from the paths dictated by the magnetic fields. The ion-beam momentum is very much larger than the momentum of the electrons that are necessary for space-charge neutralization. Consequently, no significant forces are available to deflect the ion beams from the desired paths in the embodiments here disclosed.

APPENDIX A

The prior art dealing with controlled thermonuclear fusion devices is extensive. Representative summaries are given in the references:

A. "Project Sherwood, the U.S. Program in Controlled Fusion," by Amasa S. Bishop, Addison-Wesley Publishing Co., 1959.

B. "An Introduction to Thermonuclear Research," by Albert Simon, Pergamon Press, 1959.

C. "Controlled Thermonuclear Reactions," by Glasstone and Lovberg, Van Nostrand Co., 1960.

D. "Prospects for Fusion Power," by Gough and Eastlund in the *Scientific American,* vol. 224, February 1971.

E. "Technological Requirements for Power by Fusion," by Don Steiner, *Proceedings of the IEEE,* vol. 63, November 1975.

APPENDIX B

This appendix summarizes the reference numerals that are used in the various figures. Insofar as practical, the same numeral refers to the same part in whatever figure that numeral appears.

Numeral Description

10—Axis of machine
11—Vacuum chamber
12—Vacuum pump
13—Solenoid coil
14—Soft-iron pole piece
15—Energizing coil for pole piece
16—Magnetic flux lines
17—Laser
18—Laser beam reflector
19—$D_2^+$ Injector
20—$T_2^+$ Injector
21—Laser beam
22—Deuteron beam current ($I_D$)
23—Triton beam current ($I_T$)
24—Net beam current ($I_B$)
25—$D_2^+$ molecular ion
26—$T_2^+$ molecular ion
27—$D^+$ ion
28—$T^+$ ion
29—Localized end coil
30—Power supply for solenoid

I claim the following:

1. In an apparatus for nuclear fusion of the type having:
   a. elongated vacuum chamber means to provide an evacuatable containment volume having an axis of symmetry;
   b. vacuum pump means communicating with said vacuum chamber so as to maintain a gas pressure less than $10^{-3}$ torr within the vacuum chamber;
   c. means for producing magnetic fields so that said magnetic fields are present substantially throughout said vacuum chamber, said magnetic-field-producing means consisting of solenoidal windings so disposed that the axis of the magnetic field is essentially parallel to the axis of the elongated vacuum chamber;

an improved particle-injection apparatus comprising:
   d. means for injecting fusible energetic particles having kinetic energy greater than $10^4$ electron-volts, so as to enter said magnetic fields in the direction approximately perpendicular to the axis of said vacuum chamber, but having sufficient inclination so as to avoid impact on said injection means;
   e. means for changing the charge state of said fusible particles while within said magnetic fields so that the resulting ions are produced within said magnetic fields to form ion beams;
   f. said injection and change-in-charge-state being accomplished for a period of time so that said ion beams attain a density greater than $10^{12}$ particles per cubic centimeter;
   g. said ion beams consisting of fusible species such as deuterons and tritons whose velocities are approximately in the same direction and whose speeds differ so as to cause fusion reactions in overtaking collisions between said ion beams, this being stated mathematically:

$$V_D = V_T + V_{rel}$$

where $V_D$ represents the velocity of one species of fusible ions, such as deuterons, $V_T$ represents the velocity of another species of fusible ions, such as tritons, and $V_{rel}$ represents the difference in velocity of said fusible species, such as deuterons and tritons;
   h. said ion beams such as deuterons and tritons having approximately equal momenta per unit electric charge, this being stated mathematically:

$$M_D V_D Q_T = M_T V_T Q_D$$

where $M_D$ and $V_D$ represent, respectively, the mass and the velocity of one species of fusible ions, such as deuterons; and $M_T$ and $V_T$ represent, respectively, the mass and the velocity of another species of fusible ions, such as tritons; and $Q_D$ and $Q_T$ represent, respectively, the electric charges of the fusible ions, such as deuterons and tritons;
   i. means for producing electrons within and in the vicinity of said ion beams so as to substantially neutralize the charge of said ion beams, thereby producing an essentially neutral plasma.

2. The invention of claim 1 for producing nuclear fusion reactions modified in that means for producing magnetic fields are further defined in that magnetically permeable material is located near the ends of said solenoidal windings so as to increase the intensity of the magnetic flux in the vicinity of said ends of the solenoidal windings.

3. The invention of claim 1 for producing nuclear fusion reactions modified in that means for producing magnetic fields are further defined in that magnetically permeable material is located near the ends of said solenoidal windings and arranged in essentially semi-circular shape so as to provide a low-reluctance path for the magnetic flux from one solenoidal winding to another adjacent solenoidal winding, both windings being spaced apart and essentially parallel.

4. The invention of claim 1 for producing nuclear fusion reactions modified in that means for producing magnetic fields are further defined in that localized coils are positioned near the ends of said solenoidal windings so as to increase the intensity of the magnetic flux in the vicinity of said localized coils.

5. The invention of claim 4 for producing nuclear fusion reactions modified in that means for producing magnetic fields are further defined in that magnetically permeable material is located near the ends of said solenoidal windings and arranged in essentially semi-circular shape so as to provide a low-reluctance path for the magnetic flux from one solenoidal winding to another adjacent solenoidal winding, both windings being spaced apart and essentially parallel.

6. The invention of claim 1 for producing nuclear fusion reactions further defined to include deuterons and tritons as the fusible species.

7. The invention of claim 1 for producing nuclear fusion reactions further defined to include deuterons of approximately 1,500,000 electron-volts energy and tritons of approximately 1,000,000 electron-volts energy, as nominal values of kinetic energy after being trapped in the magnetic field.

8. The invention of claim 1 for producing nuclear fusion reactions further defined to include deuterons of approximately 1,800,000 electron-volts energy and $He^3$, namely doubly-charged helium ions which have the isotopic mass number of three, of 4,800,000 electron-volts energy, as nominal values of kinetic energy after being trapped in the magnetic field, these kinetic energy values being applicable in the laboratory frame of reference and which satisfy the relation:

$$Q_{He}M_D V_D = Q_D M_{He} V_{He}$$

where $Q_D$ and $Q_{He}$ represent, respectively, the ionic charges of a deuteron and a helium nucleus, $M_D$ and $V_D$ represent, respectively the mass and the velocity of a deuteron, $M_{He}$ and $V_{He}$ represent, respectively, the mass and the velocity of the doubly-charged helium ions which have the isotopic mass number of three.

9. The invention of claim 1 for producing nuclear fusion reactions further defined to include deuterons of approximately 1,600,000 electron-volts energy, tritons of approximately 1,000,000 electron-volts energy, and $He^3$ doubly-charged ions of approximately 4,800,000 electron-volts energy, all three types of ions having velocities in the same direction and essentially parallel to each other and to the axis of said vacuum chamber.

* * * * *